United States Patent
Narasimha et al.

(10) Patent No.: US 11,751,093 B2
(45) Date of Patent: Sep. 5, 2023

(54) FLOW CONTROL FOR UPLINK TRAFFIC IN AN INTEGRATED ACCESS AND BACKHAUL NETWORK

(71) Applicant: APPLE INC., Cupertino, CA (US)

(72) Inventors: Murali Narasimha, Lake Oswego, OR (US); Sudeep Palat, Cloucestershire (GB); Candy Yiu, Portland, OR (US)

(73) Assignee: APPLE INC., Cupertino, CA (US)

(*) Notice: Subject to any disclaimer, the term of this patent is extended or adjusted under 35 U.S.C. 154(b) by 287 days.

(21) Appl. No.: 17/264,688

(22) PCT Filed: Aug. 8, 2019

(86) PCT No.: PCT/US2019/045772
§ 371 (c)(1),
(2) Date: Jan. 29, 2021

(87) PCT Pub. No.: WO2020/033740
PCT Pub. Date: Feb. 13, 2020

(65) Prior Publication Data
US 2021/0306904 A1 Sep. 30, 2021

Related U.S. Application Data

(60) Provisional application No. 62/716,447, filed on Aug. 9, 2018.

(51) Int. Cl.
*H04B 7/155* (2006.01)
*H04W 28/02* (2009.01)

(52) U.S. Cl.
CPC ........ *H04W 28/0278* (2013.01); *H04B 7/155* (2013.01); *H04W 28/0289* (2013.01)

(58) Field of Classification Search
CPC ........................... H04B 7/155; H04W 28/0289
See application file for complete search history.

(56) References Cited

U.S. PATENT DOCUMENTS

| | | | |
|---|---|---|---|
| 2009/0196177 A1 | 8/2009 | Teyeb et al. | |
| 2010/0302946 A1* | 12/2010 | Yang | ........................ H04L 47/30 370/235 |
| 2012/0236782 A1 | 9/2012 | Bucknell et al. | |
| 2018/0139646 A1 | 5/2018 | Basu Mallick et al. | |
| 2019/0357117 A1* | 11/2019 | Cudak | ................... H04L 49/506 |
| 2021/0099914 A1* | 4/2021 | Wei | ........................ H04W 28/16 |
| 2021/0127293 A1* | 4/2021 | Hong | ..................... H04W 28/04 |
| 2021/0211939 A1* | 7/2021 | Teyeb | .................... H04W 28/12 |

FOREIGN PATENT DOCUMENTS

| | | |
|---|---|---|
| KR | 1020130025915 A | 3/2013 |
| KR | 1020140111349 A | 9/2014 |

OTHER PUBLICATIONS

PCT/US2019/045772, International Search Report and Written Opinion, dated Nov. 29, 2019, 10 pages.

* cited by examiner

*Primary Examiner* — Christopher M Crutchfield
*Assistant Examiner* — Tito Q Pham
(74) *Attorney, Agent, or Firm* — Dorsey & Whitney LLP

(57) ABSTRACT

Systems and methods provide flow control for uplink traffic in an integrated access and backhaul network. A first relay node determines that its uplink buffer has reached an occupancy level higher than a pre-determined level. In response, the first relay node transmits, to a second relay node associated with the first relay node, a message indicating a buffer occupancy status of the uplink buffer of the first relay node.

18 Claims, 11 Drawing Sheets

FLOW CONTROL FOR UPLINK TRAFFIC IN AN INTEGRATED ACCESS AND BACKHAUL NETWORK

CROSS-REFERENCE TO RELATED APPLICATIONS

This application is a national stage filing under 35 U.S.C. § 371 of International Patent Application No. PCT/US2019/045772, filed Aug. 8, 2019 which claims the benefit of U.S. Provisional Application No. 62/716,447, filed Aug. 9, 2018, each of which is hereby incorporated by reference herein in its entirety.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure is related to Integrated Access and Backhaul (IAB), which is a feature being designed in 3GPP to enable multi-hop routing. IAB nodes serve as both access nodes to UEs and provide backhaul links to other IAB nodes. Embodiments herein provide flow control mechanisms on the uplink in such a network.

A goal of flow control is to control the incoming data rate so that packets are not dropped due to buffers overflowing. In other words, flow control tries to ensure that the incoming data rate matches the capacity of the link(s) over which the data travels. In the downlink, for example, when a route includes a sequence of links (see, e.g., FIG. 6) from a Donor to Node 1 to Node 2 to Node 3, Node 1 does not know when the downlink buffer at Node 2 is approaching overflow. Such a situation would occur when the link from Node 2 to Node 3 is congested. This calls for a "back-pressure" mechanism, which tries to slow the incoming data from the Donor going over the link from Node 2 to Node 3.

A similar congestion situation can occur on the uplink route (Node 3 to Node 2 to Node 1 to Donor). That is, congestion on the link from Node 1 to Donor can cause the uplink buffer at Node 1 to overflow. However, for uplink traffic, Node 1 can mitigate the buffer overflow risk by allocating fewer uplink resources for the Node 2 to Node 1 transmission (referred to as implicit backpressure). This can, however, lead to a buffer overflow risk at Node 2. In response, Node 2 allocates fewer uplink resources, and this leads to a peristaltic progression of the congestion down the route. If the data rate injected into Node 3 is high, this slow back-pressure mechanism is likely unable to avoid buffer overflows.

Given that dropping of packets is highly undesirable (e.g., will lead to retransmissions, causes transmission control protocol (TCP) congestion avoidance to initiate, etc.), it is useful to have flow control that is robust. However, if congestion on a link is long term, flow control does not address the problem. In such situations, it may be necessary to identify alternate routes and map bearers to routes taking into account the congested link. Certain embodiments herein mitigate the effects of the implicit backpressure mechanism described above and/or propose alternative approaches.

Congestion occurrences on a link can be classified into at least two types. In one type of congestion, signal-to-noise (SNR) on a link drops significantly causing the link to not be able to support the data rate that was ongoing or promised to bearers. Such a drop in SNR could be short term or long term. In another type of congestion, when multiple variable data rate bearers are multiplexed onto a link, the amount of data generated for multiple bearers can peak at the same time. The congestion caused by such an event is generally short.

Figure 1:
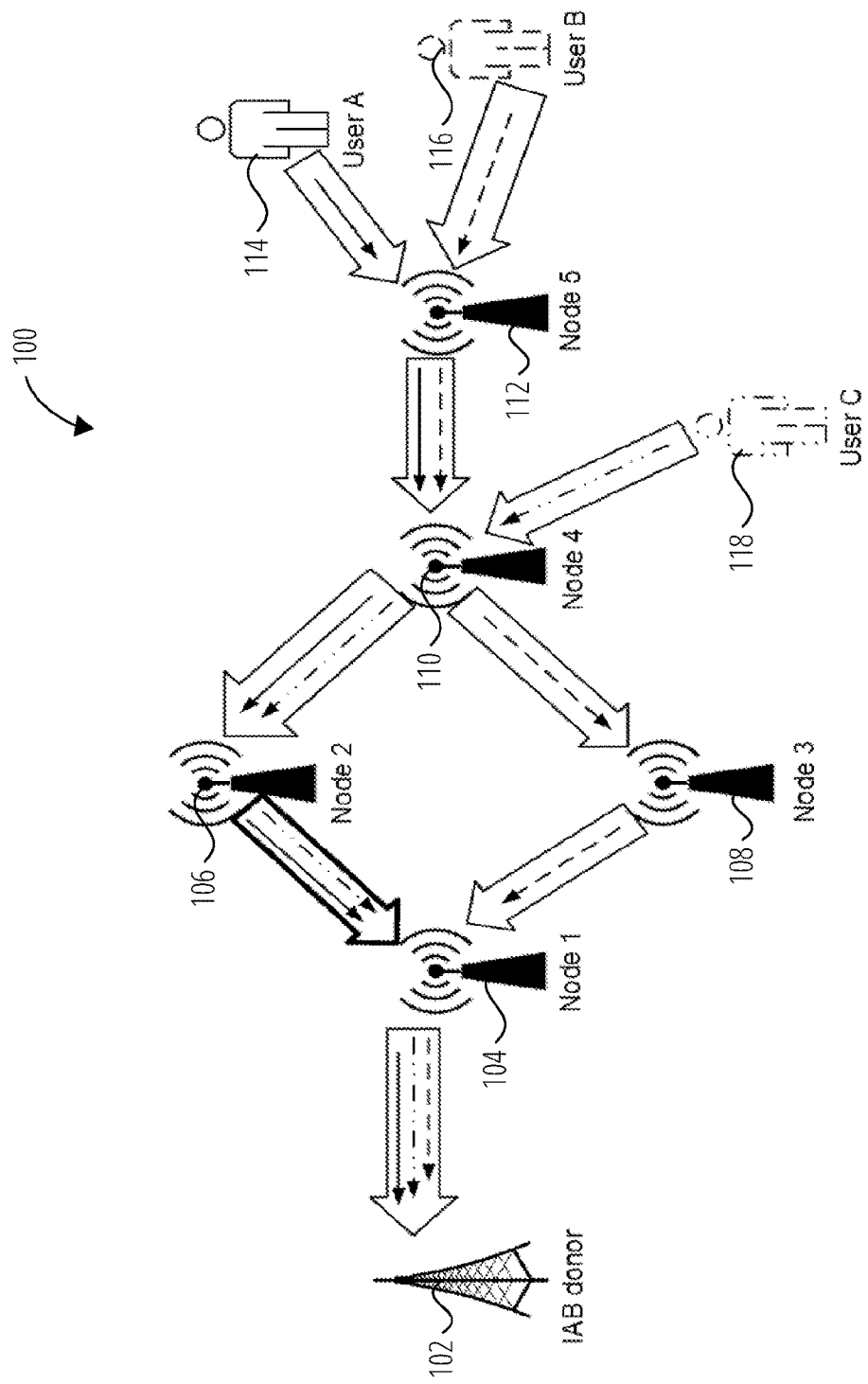
FIG. 1 schematically illustrates example integrated access and backhaul (IAB) network in accordance with one embodiment.

FIG. 1 schematically illustrates an example IAB network 100 including an IAB donor 102 and five IAB nodes comprising a first node 104 (Node 1), a second node 106 (Node 2), a third node 108 (Node 3), a fourth node 110 (Node 4), and a fifth node 112 (Node 5). As used herein, the IAB nodes may also be referred to as relay nodes. A relay node may receive uplink traffic (represented by arrows) from a descendant or child relay node (or from a UE) and provide the uplink traffic to a parent relay node. Uplink traffic from UEs associated with three users (User A 114, User B 116, and User C 118) are routed through the example IAB network 100. User A and User B are attached to the fifth node 112, and User C is attached to the fourth node 110. User A's uplink traffic is routed through the fourth node 110, second node 106, and first node 104. User B's uplink traffic is routed through the fourth node 110, third node 108, and first node 104. User C's uplink traffic is routed through the second node 106 and first node 104. Although the arrows shown in FIG. 1 (as well as certain arrows shown in FIG. 3 and FIG. 5) represent uplink traffic, persons skilled in the art will recognize from the disclosure herein that the IAB nodes may also be used for downlink traffic. See, for example, FIG. 6 for a description of an example IAB architecture 600.

If the link from second node 106 to first node 104 experiences congestion, second node 106 can apply backpressure, as discussed above. That is, second node 106 limits uplink resource allocation to fourth node 110. Second node 106 uses a buffer level to decide when backpressure is applied.

When second node 106 starts applying backpressure, fourth node 110 is still unaware of any congestion issues. Further, the UEs of User A, User B, and User C continue to push data into the network (i.e., they request uplink resources from their respective serving IAB nodes and are allocated resources since the IAB nodes are not aware of the congestion issue between second node 106 and first node 104). The buffers at fourth node 110 and fifth node 112 eventually reach a level where their respective backpressure mechanisms are triggered and the resources allocated to the UEs are reduced. However, between the time when the backpressure mechanism is triggered at second node 106 and the time when fourth node 110 and fifth node 112 trigger their respective backpressure mechanisms, a significant amount of data has entered the network.

Figure 2:
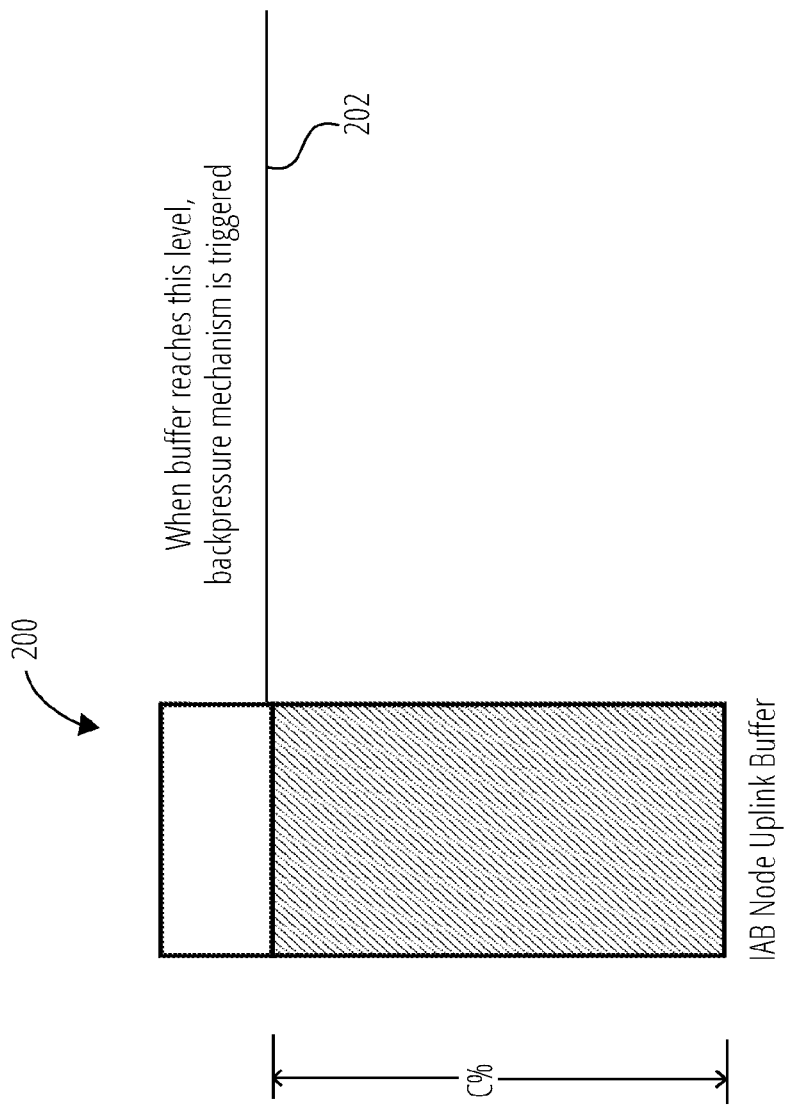
FIG. 2 schematically illustrates an IAB node uplink buffer in accordance with one embodiment.

FIG. 2 schematically illustrates an IAB node uplink buffer 200 according to one embodiment. A shaded portion of the IAB node uplink buffer 200 represents an instantaneous buffer occupancy percentage. When the instantaneous buffer occupancy percentage reaches a predetermined occupancy level 202, a backpressure mechanism is triggered. In the example shown in FIG. 2, the predetermined occupancy level 202 corresponds to C % of the entire IAB node uplink buffer 200 capacity.

Referring to FIG. 1 and FIG. 2, to reduce the number of dropped packets and/or to ensure that packets are not dropped, when second node 106 starts the backpressure mechanism for example, second node 106 may ensure that it can accommodate the data that will continue to enter the network until the IAB nodes serving the UEs start their backpressure mechanisms. This implies that the level at which the backpressure mechanism is triggered (parameter C % in FIG. 2) is adjusted based on the length of the routes and the number of UEs. This can lead to smaller values of predetermined occupancy level 202 (C %) as routes increase in length and the number of UEs increases, causing a significant under-utilization of the buffers.

Embodiments herein provide mechanisms that react faster than conventional mechanisms to uplink congestion on a route. Certain embodiments include delivering buffer occupancy information of the uplink buffer at each IAB node to nodes that are descendants. The embodiments enable the descendant nodes to take buffer limitations along the route into account when performing uplink resource allocation. The quicker reaction to congestion results in less data being injected into the network after congestion conditions have been observed.

Figure 3:
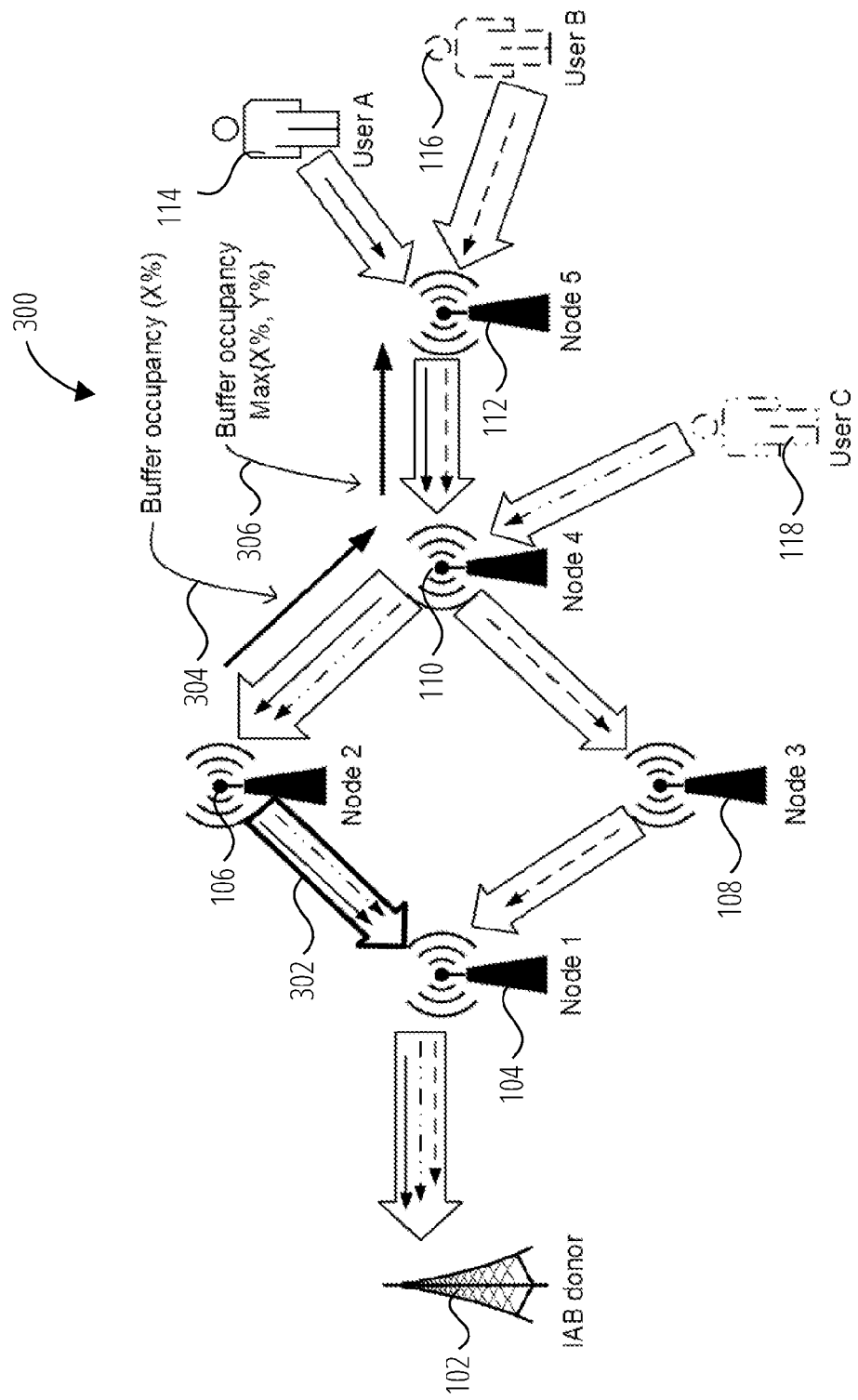
FIG. 3 illustrates an example IAB network in accordance with one embodiment.

Buffer occupancy refers to the fraction of the buffer that includes data that is awaiting transmission. According to various embodiments, buffer occupancy information is delivered to descendant nodes. FIG. 3 shows an example IAB network 300 where an explicit backpressure mechanism is used. As in FIG. 1, the example IAB network 300 shown in FIG. 3 includes the IAB donor 102 and the five IAB nodes comprising the first node 104, the second node 106, the third node 108, the fourth node 110, and the fifth node 112. Uplink traffic from UEs associated with the three users (User A 114, User B 116, and User C 118) are routed through the example IAB network 300. User A and User B are attached to fifth node 112, and User C is attached to fourth node 110. User A's traffic is routed through fourth node 110, second node 106, and first node 104. User B's traffic is routed through fourth node 110, third node 108, and first node 104. User C's traffic is routed through second node 106 and first node 104.

In the example of FIG. 3, when the buffer at second node 106 reaches a critical level that suggests a possibility of congestion on the link from second node 106 to first node 104 (indicated by the arrow 302 in FIG. 3), second node 106 transmits a buffer occupancy status 304 to its child nodes. That is, second node 106 transmits a message (referred to as "buffer occupancy status" (BOS) message or the like) that includes its instantaneous buffer occupancy to fourth node 110. The buffer occupancy status message may express or otherwise indicate the instantaneous buffer occupancy as a percentage (e.g., as "X %"), an amount of occupied memory space, an amount of available space, and/or any other suitable indication, such as those discussed herein.

In certain embodiments, due to its uplink buffer approaching overflow, fourth node 110 allocates fewer resources for fourth node 110 to second node 106 transmissions. Fourth node 110 takes into account the buffer occupancy at second node 106 when allocating resources for fifth node 112 to 110 transmissions. In particular, fourth node 110 receives a buffer status report (BSR) from fifth node 112 indicating the amount of buffered uplink data at fifth node 112; and fourth node 110 controls the data rate from fifth node 112 to fourth node 110 by controlling the uplink resources allocated to fifth node 112 so that the risk of buffer overflow at fourth node 110 is reduced or minimized. Without the indication of the buffer occupancy of the example embodiments, the buffer at fourth node 110 would need to approach a critical level before fourth node 110 starts reducing the data rate from fifth node 112 to fourth node 110. This delay in reducing the data rate is avoided, according to certain embodiments herein.

Fourth node 110 also transmits a buffer occupancy status 306 to its child node, fifth node 112. In certain embodiments, the buffer occupancy status 306 can indicate a buffer occupancy that is the maximum of its own buffer occupancy (Y %) and the buffer occupancy indicated by Node B (X %). This approach results in a node indicating the highest buffer occupancy seen along a given route in its buffer occupancy status message.

In response to the buffer occupancy status 306, fifth node 112 controls the uplink resources allocated to transmissions from User A and User B such that the risk of buffer overflow at fifth node 112 is minimized.

In certain embodiments, second node 106 can transmit the buffer occupancy status 304 to its child nodes taking into account its own buffer occupancy and the buffer occupancy status received from its parents. Since different bearers can be routed along different routes, the buffer occupancy is bearer specific and may be handled at the adaptation layer. Such an approach can enable faster awareness of congestion along the route. Individual nodes can then take this information into account in allocating uplink resources.

Projected Buffer Occupancy Status

The buffer occupancy can change quickly as the node receives data from UEs and its descendant nodes and transmits data to its parent nodes. In order to make the buffer occupancy metric more reflective of the conditions when it is used, according to certain embodiments, a projected buffer occupancy may be defined. The projected buffer occupancy is obtained by adding to the buffer and/or subtracting from the buffer.

Adding to the buffer includes adding values corresponding to sizes of buffer status reports received at the node and re-computing the buffer occupancy. That is, the buffered data awaiting transmission to this node for which buffer status reports have already been received are counted as already received (the projected buffer occupancy tries to show the buffer occupancy after data for which BSRs have been received, are received).

Subtracting from the buffer includes subtracting values corresponding to sizes of uplink grants received at the node and re-computing the buffer occupancy. That is, the buffered data at this node for which uplink resources have already been provided is not counted (the projected buffer occupancy tries to show the buffer occupancy after the data for which uplink grants have been received, are transmitted and removed from buffer).

Triggering of Buffer Occupancy Status

As noted previously, the buffer occupancy status can be transmitted when the buffer occupancy reaches a predefined critical level. Alternatively (or in addition), the buffer occupancy status can be transmitted when the node receives a BSR from a child IAB node. That is, the buffer occupancy status can be transmitted in response to a BSR.

Buffer Occupancy Status Timeout

Given that buffer occupancy can be quite dynamic, its validity is likely to be no more than a few hundred milliseconds. A timer can be used to control how long buffer occupancy is treated as valid by an IAB node that receives a buffer occupancy status (BOS). At timer expiry, the BOS is discarded. Furthermore, a new BOS received from a node overwrites a previously stored BOS.

One embodiment uses a pre-configured value for the validity timer duration. In another embodiment, an expiry time (based on a common network wide time reference) can be included in the BOS. In this approach each child node, when generating its BOS, uses the expiry time provided by the parent node.

In the approach described above, an IAB node receiving a BOS generates its own BOS based on the received BOS, for transmission to other nodes. As an alternative, an IAB node can simply relay (retransmit) the BOS received and also transmit independently its own BOS (in this case the own BOS will not involve comparison of the two buffer occupancies).

Example Protocol Architecture for Buffer Occupancy Status (BOS)

Figure 4:
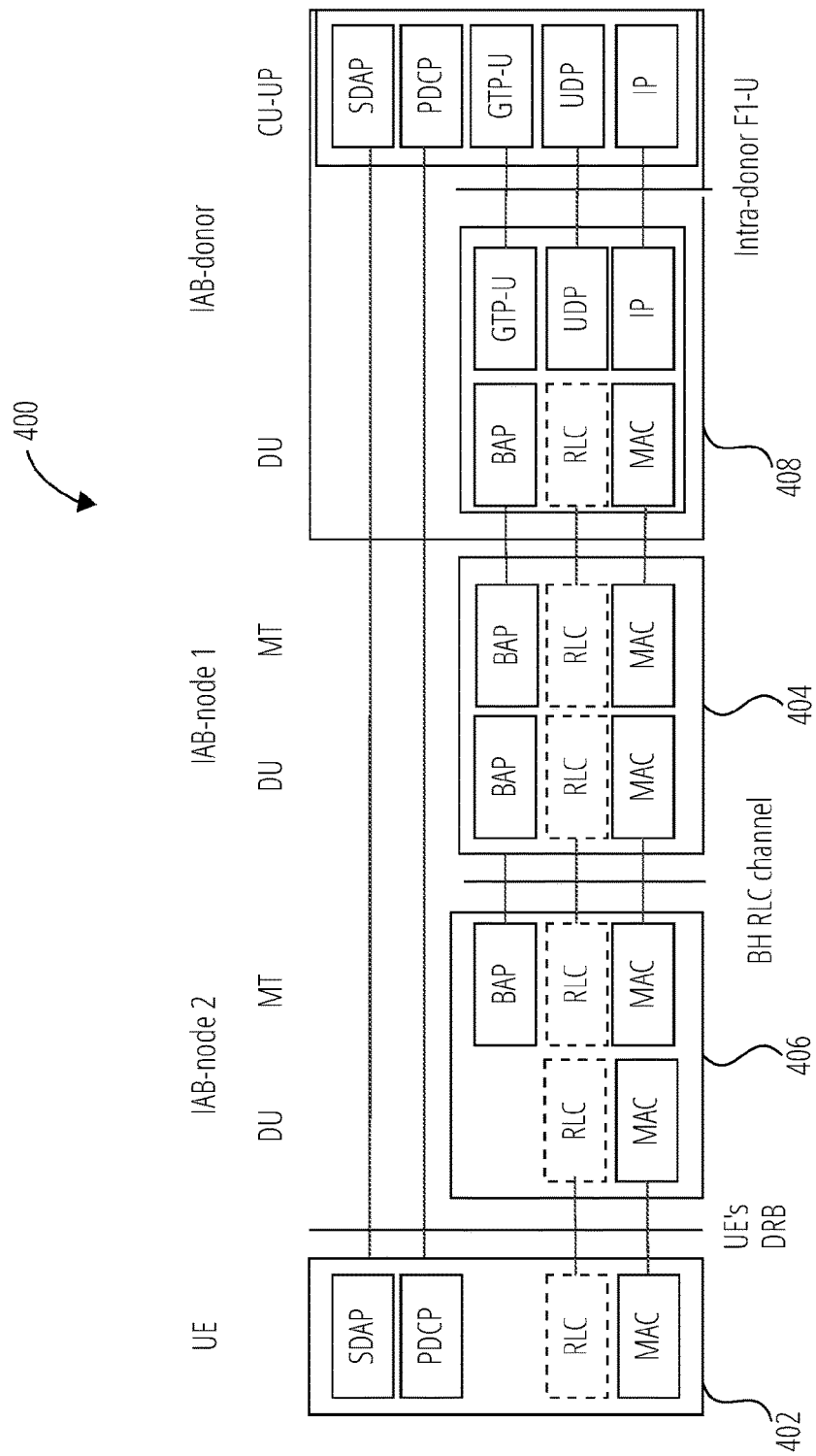
FIG. 4 illustrates an example protocol architecture for IAB in accordance with one embodiment.

FIG. 4 illustrates an example protocol architecture for IAB 400 according to one embodiment. The example protocol architecture for IAB 400 shows various protocol layers for a UE 402, a first IAB-node 404 (IAB-node 1), a second IAB-node 406 (IAB-node 2), and an IAB-donor 408. The various layers may correspond to mobile terminated (MT), distributed unit (DU), or centralized unit (CU)-user plane (UP) entities. The DU and CU-UP of the IAB-donor 408 may communicate through an intra-donor F1-U interface. In this example, the UE 402 wireless communicates with the second IAB-node 406 through the UE's dedicated radio bearer (DRB), and the second IAB-node 406 wirelessly relays the uplink traffic to the first IAB-node 404 through a backhaul (BH) radio link control (RLC) channel. The protocol layers include, for example, medium access control (MAC), RLC, packet data convergence protocol (PDCP), service data adaptation protocol (SDAP), internet protocol (IP), user datagram protocol (UDP), and general packet radio service (GPRS) tunneling protocol user plane (GTP-U).

The example protocol architecture for IAB 400 also includes a backhaul adaptation protocol (BAP) layer, which may also be referred to as an "Adapt" layer (short for Adaptation layer), that provides functionality for routing data for different UE bearers over different routes through the network. This may be done by having an adaptation layer header that includes some information to identify a bearer. The routing includes mapping incoming data to an outgoing link based on the bearer identifier.

Given that different UE bearers can be carried on different routes through the network, in certain embodiments, the buffer occupancy status generated by a node is relevant only to bearers that are routed through that node and the IAB nodes on those routes.

Figure 5:
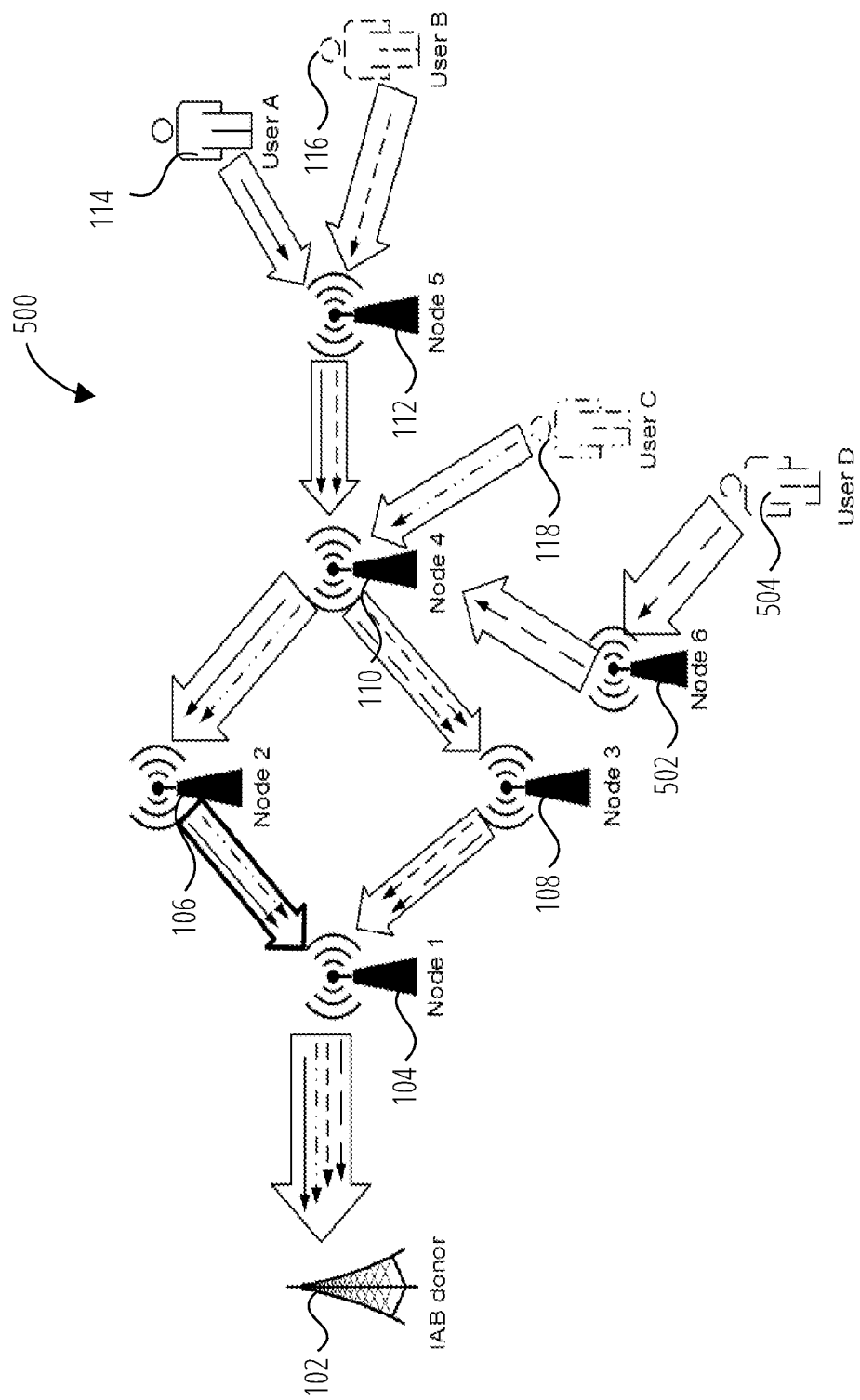
FIG. 5 illustrates an example IAB network in accordance with one embodiment.

Referring to FIG. 5, for example, the link from second node 106 to first node 104 carries traffic for User A and User C, but not User B and User D. Thus, the buffer occupancy status generated by IAB second node 106 is relevant only to the bearers carrying traffic of User A and User C (and consequently to IAB fourth node 110 and fifth node 112). Thus, the BOS messages should follow the same routing as the bearers. For example, the BOS message generated by second node 106 is sent to fourth node 110; fourth node 110 generates its BOS message based on the received BOS message and transmits it to fifth node 112. Note that the BOS message generated by fourth node 110 is not sent to sixth node 502 although User D's data is received at fourth node 110 via sixth node 502.

Referring to FIG. 4 and FIG. 5, to facilitate appropriate routing, the BOS functionality can be placed in the BAP layer or adaptation layer. That is, the BOS message can be defined as a BAP layer control protocol data unit (PDU). The information for the buffer occupancy can be received from either that RLC layer or the MAC layer, which specifically maintain buffers for un-transmitted data.

Note that the BAP layer placement in FIG. 4 is only an example. The same principles hold if the BAP layer is placed, for example, between the RLC and MAC layers.

In certain embodiments, if congestion occurs at the first node 104 to IAB donor link, then BOSS are generated and transmitted in the following sequences: first node 104 to second node 106 to fourth node 110 to fifth node 112; and/or first node 104 to third node 108 to fourth node 110 to sixth node 502

Alternate Metrics for Congestion Indication

The above description defines buffer occupancy as the fraction of the buffer that is used for data awaiting transmission. Alternative metrics that can be considered include: buffer availability (fraction of the buffer that is unused); and/or remaining buffer capacity available (in bytes).

In addition, or in other embodiments, instead of using a metric as defined above, the BOS can simply indicate whether the link is approaching congestion (e.g., a 1 bit yes/no indication to cause the receiving nodes to reduce uplink data rates).

Note also that when the buffer occupancy status is constructed by an IAB node upon receiving BOS from a parent node, it can use, instead of max, another function such as mean, to compute the buffer occupancy value to include in its BOS.

In an example embodiment, a method in a first relay node comprises: determining that the uplink buffer at the relay node has reached an occupancy level higher than a predetermined level; transmitting, to a second relay node associated with the first relay node, a message indicating a buffer occupancy status of the uplink buffer of the first relay node.

In another example embodiment, a method in a first relay node comprises: receiving from a second relay node a message indicating a buffer occupancy status of the uplink buffer of the second relay node; determining a buffer occupancy status based on the buffer occupancy status of the uplink buffer of the second relay node and the buffer occupancy of the uplink buffer of the first relay node; and transmitting the buffer occupancy status to a third relay node, wherein the third relay node is associated with the first relay node.

Figure 6:
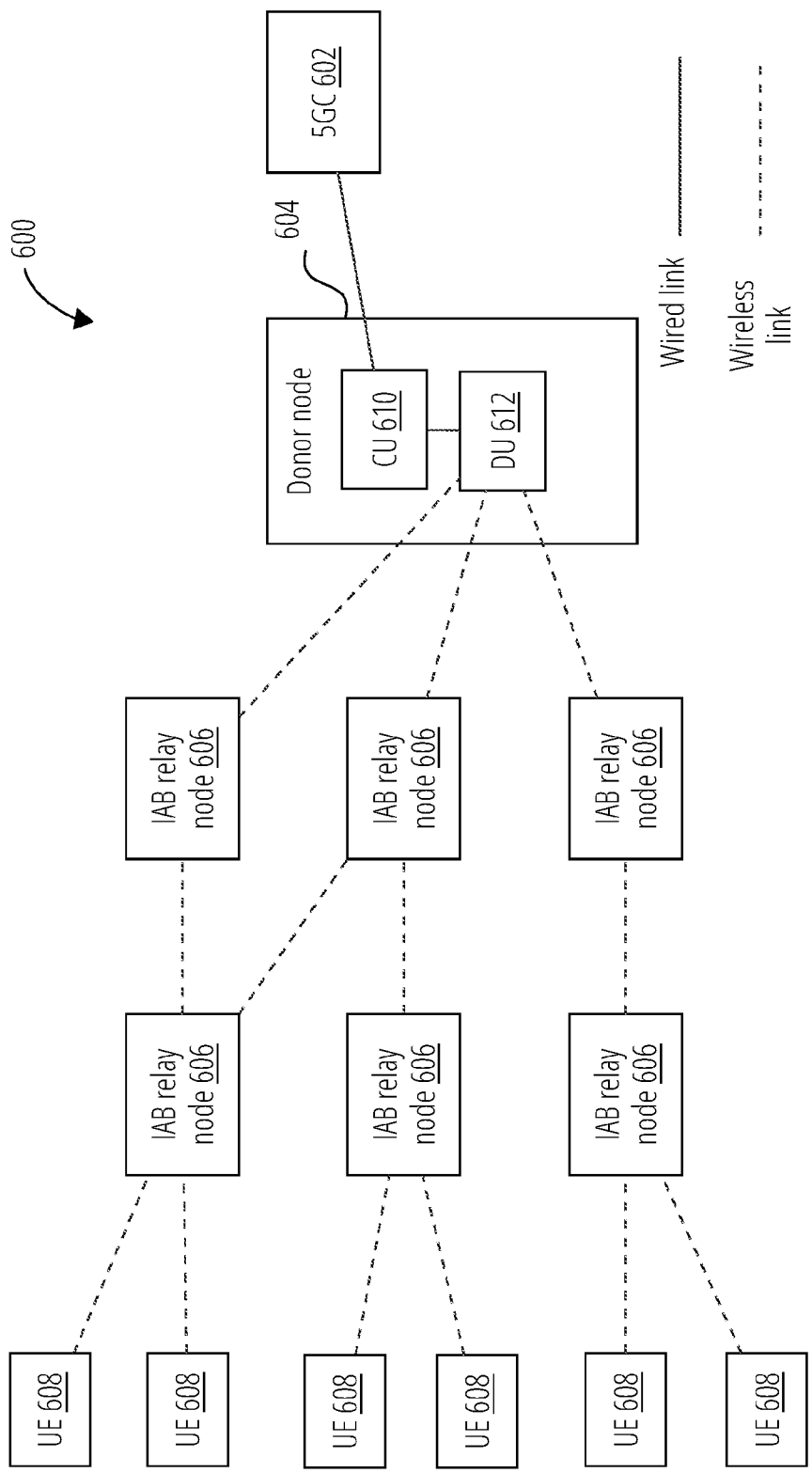
FIG. 6 illustrates an IAB architecture in accordance with one embodiment.

FIG. 6 illustrates an example IAB architecture 600 according to one embodiment. The example IAB architecture 600 comprises a 5GC 602, a donor node 604, a plurality of IAB nodes (six IAB nodes shown as IAB relay node 606), and a plurality of UEs (six UEs shown as UE 608). The donor node 604 may include a centralized unit (CU, shown as CU 610) and a distributed unit (DU, shown as DU 612). The CU 610 may be split, for example, into a control plane CU and user plane CU. Further, although only one is shown, the DU 612 may comprise a plurality of distributed units. As shown, solid lines between the CU 610 and the 5GC 602 and the DU 612 may represent wired links, whereas dashed lines may represent wireless links.

Each IAB relay node 606 (also referred to herein as IAB RN or as a "relay Transmission/Reception Point" or "rTRP") is a network node in an IAB deployment having UE and (at least part of) gNB functions. As shown, some IAB RNs access other IAB RNs, and some IAB RNs access the donor node 604. An IAB DN (or IAB donor, also referred to as an "anchor node" or the like) is a network node in an IAB deployment that terminates NG interfaces via wired connection(s). The IAB DN is a RAN node that provides a UE's interface to a core network (shown as 5GC 602) and wireless backhauling functionality to IAB nodes. An IAB node is a relay node and/or a RAN node that supports wireless access to UEs and wirelessly backhaul access traffic.

In embodiments, the IAB system architecture supports multi-hop backhauling. IAB multi-hop backhauling provides more range extension than single hop systems. Multi-hop backhauling further enables backhauling around obstacles (e.g., buildings in urban environment for in-clutter deployments). The maximum number of hops in a deployment is expected to depend on many factors such as frequency, cell density, propagation environment, traffic load, various Key Performance Indicators (KPIs), and/or other like factors. From the architecture perspective, flexibility in hop count is desirable, and therefore, the IAB system may not impose limits on the number of backhaul hops.

The IAB system architecture also supports topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB-nodes and/or mobile IAB-nodes. Also, traffic variations can create uneven load distribution on wireless backhaul links leading to local link or node congestion.

In embodiments where multi-hop and topology adaptation are supported, the IAB nodes include topology management mechanisms and route selection and optimization (RSO) mechanisms. Topology management mechanisms include protocol stacks, interfaces between rTRPs or IAB nodes, control and user plane procedures for identifying one or more hops in the IAB network, forwarding traffic via one or multiple wireless backhaul links in the IAB network, handling of QoS, and the like. The RSO mechanisms include mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; and mechanisms for evaluating different resource allocations/routes across multiple nodes for end-to-end RSO.

The operation of the different links may be on the same frequencies ("in-band") or different frequencies ("out-of-band"). In-band backhauling includes scenarios where access and backhaul links at least partially overlap in frequency creating half-duplexing or interference constraints, which may imply that an IAB node may not transmit and receive simultaneously on both links. By contrast, out-of-band scenarios may not have such constraints. In embodiments, one or more of the IAB nodes include mechanisms for dynamically allocating resources between backhaul and access links, which include mechanisms to efficiently multiplex access and backhaul links (for both DL and UL directions) in time, frequency, or space under a per-link half-duplex constraint across one or multiple backhaul link hops for both TDD and FDD operation; and cross-link interference (CLI) measurement, coordination and mitigation between rTRPs and UEs.

Figure 7:
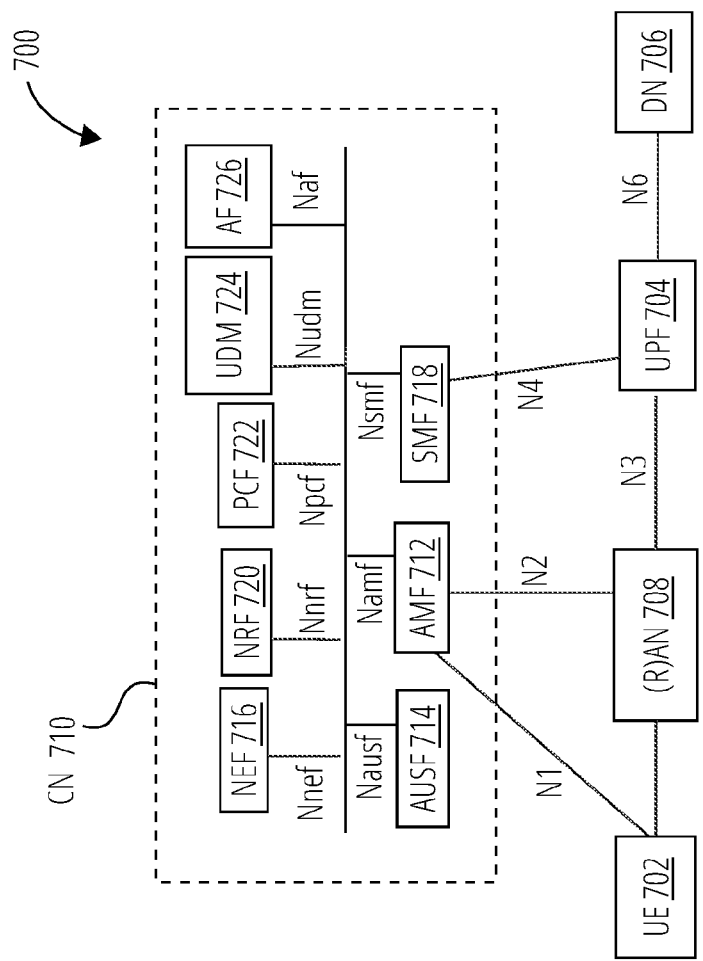
FIG. 7 illustrates a system in accordance with one embodiment.

FIG. 7 illustrates an architecture of a system 700 of a network in accordance with some embodiments. The system 700 is shown to include a UE 702; a 5G access node or RAN node (shown as (R)AN node 708); a User Plane Function (shown as UPF 704); a Data Network (DN 706), which may be, for example, operator services, Internet access or 3rd party services; and a 5G Core Network (5GC) (shown as CN 710).

The CN 710 may include an Authentication Server Function (AUSF 714); a Core Access and Mobility Management Function (AMF 712); a Session Management Function (SMF 718); a Network Exposure Function (NEF 716); a Policy Control Function (PCF 722); a Network Function (NF) Repository Function (NRF 720); a Unified Data Management (UDM 724); and an Application Function (AF 726). The CN 710 may also include other elements that are not shown, such as a Structured Data Storage network function (SDSF), an Unstructured Data Storage network function (UDSF), and the like.

The UPF 704 may act as an anchor point for intra-RAT and inter-RAT mobility, an external PDU session point of interconnect to DN 706, and a branching point to support multi-homed PDU session. The UPF 704 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 704 may include an uplink classifier to support routing traffic flows to a data network. The DN 706 may represent various network operator services, Internet access, or third party services.

The AUSF 714 may store data for authentication of UE 702 and handle authentication related functionality. The AUSF 714 may facilitate a common authentication framework for various access types.

The AMF 712 may be responsible for registration management (e.g., for registering UE 702, etc.), connection management, reachability management, mobility management, and lawful interception of AMF-related events, and access authentication and authorization. AMF 712 may provide transport for SM messages for the SMF 718, and act as a transparent proxy for routing SM messages. AMF 712 may also provide transport for short message service (SMS) messages between UE 702 and an SMS function (SMSF) (not shown by FIG. 7). AMF 712 may act as Security Anchor Function (SEA), which may include interaction with the AUSF 714 and the UE 702, receipt of an intermediate key that was established as a result of the UE 702 authentication process. Where USIM based authentication is used, the AMF 712 may retrieve the security material from the AUSF 714. AMF 712 may also include a Security Context Management (SCM) function, which receives a key from the SEA that it uses to derive access-network specific keys. Furthermore, AMF 712 may be a termination point of RAN CP interface (N2 reference point), a termination point of NAS (NI) signaling, and perform NAS ciphering and integrity protection.

AMF 712 may also support NAS signaling with a UE 702 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 702 and AMF 712, and relay uplink and downlink user-plane packets between the UE 702 and UPF 704. The N3IWF also provides mechanisms for IPsec tunnel establishment with the UE 702.

The SMF 718 may be responsible for session management (e.g., session establishment, modify and release, including tunnel maintenance between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 718 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 716 may provide means for securely exposing the services and capabilities provided by 3GPP network functions for third party, internal exposure/re-exposure, Application Functions (e.g., AF 726), edge computing or fog computing systems, etc. In such embodiments, the NEF 716 may authenticate, authorize, and/or throttle the AFs. NEF 716 may also translate information exchanged with the AF 726 and information exchanged with internal network functions. For example, the NEF 716 may translate between an AF-Service-Identifier and an internal 5GC information. NEF 716 may also receive information from other network functions (NFs) based on exposed capabilities of other network functions. This information may be stored at the NEF 716 as structured data, or at a data storage NF using a standardized interface. The stored information can then be re-exposed by the NEF 716 to other NFs and AFs, and/or used for other purposes such as analytics.

The NRF 720 may support service discovery functions, receive NF Discovery Requests from NF instances, and provide the information of the discovered NF instances to the NF instances. NRF 720 also maintains information of available NF instances and their supported services.

The PCF 722 may provide policy rules to control plane function(s) to enforce them, and may also support unified policy framework to govern network behavior. The PCF 722 may also implement a front end (FE) to access subscription information relevant for policy decisions in a UDR of UDM 724.

The UDM 724 may handle subscription-related information to support the network entities' handling of communication sessions, and may store subscription data of UE 702. The UDM 724 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 722. UDM 724 may also support SMS management, wherein an SMS-FE implements the similar application logic as discussed previously.

The AF 726 may provide application influence on traffic routing, access to the Network Capability Exposure (NCE), and interact with the policy framework for policy control. The NCE may be a mechanism that allows the 5GC and AF 726 to provide information to each other via NEF 716, which may be used for edge computing implementations. In such implementations, the network operator and third party services may be hosted close to the UE 702 access point of attachment to achieve an efficient service delivery through the reduced end-to-end latency and load on the transport network. For edge computing implementations, the 5GC may select a UPF 704 close to the UE 702 and execute traffic steering from the UPF 704 to DN 706 via the N6 interface. This may be based on the UE subscription data, UE location, and information provided by the AF 726. In this way, the AF 726 may influence UPF (re)selection and traffic routing. Based on operator deployment, when AF 726 is considered to be a trusted entity, the network operator may permit AF 726 to interact directly with relevant NFs.

As discussed previously, the CN 710 may include an SMSF, which may be responsible for SMS subscription checking and verification, and relaying SM messages to/from the UE 702 to/from other entities, such as an SMS-GMSC/IWMSC/SMS-router. The SMS may also interact with AMF 712 and UDM 724 for notification procedure that the UE 702 is available for SMS transfer (e.g., set a UE not reachable flag, and notifying UDM 724 when UE 702 is available for SMS).

The system 700 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 700 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 710 may include an Nx interface, which is an inter-CN interface between the MME and the AMF 712 in order to enable interworking between CN 710 and an LTE core network.

Although not shown by FIG. 7, the system 700 may include multiple RAN nodes (such as (R)AN node 708) wherein an Xn interface is defined between two or more (R)AN node 708 (e.g., gNBs and the like) that connecting to 5GC 410, between a (R)AN node 708 (e.g., gNB) connecting to CN 710 and an eNB, and/or between two eNBs connecting to CN 710.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more (R)AN node 708. The mobility support may include context transfer from an old (source) serving (R)AN node 708 to new (target) serving (R)AN node 708; and control of user plane tunnels between old (source) serving (R)AN node 708 to new (target) serving (R)AN node 708.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 8:
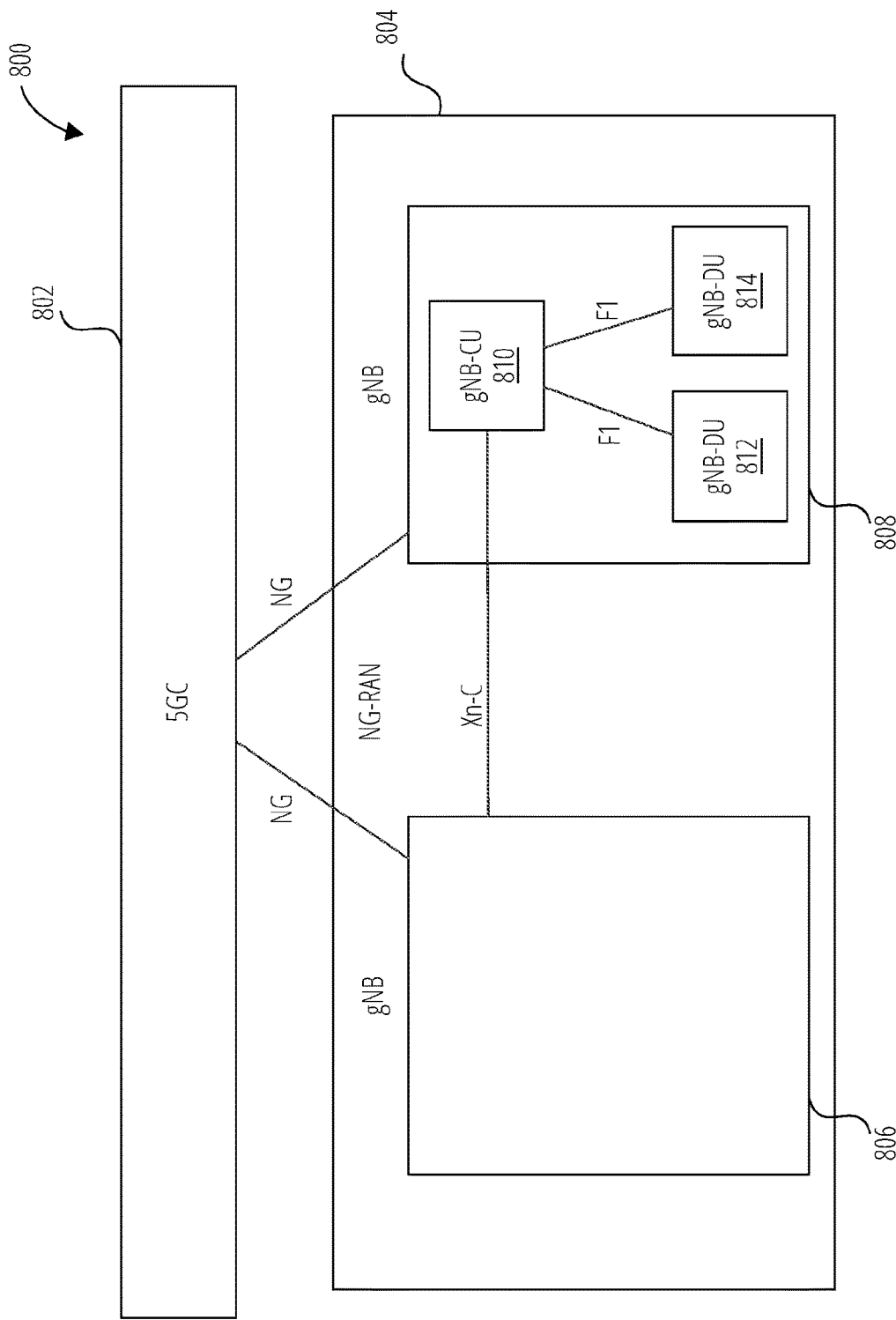
FIG. 8 illustrates an NG-RAN architecture in accordance with one embodiment.

FIG. 8 illustrates an NG-RAN architecture 800, according to one embodiment, comprising a 5GC 802 and an NG-RAN 804. The NG-RAN 804 includes a plurality of gNB (two gNB shown as gNB 806 and gNB 808) connected to the 5GC 802 through the NG interface. The gNB 806 and gNB 808 can support FDD mode, TDD mode, or dual mode operation, and are connected to one another through the Xn-C interface. As shown, the gNB 808 includes a gNB-CU 810 connected to a gNB-DU 812 and a gNB-DU 814 through the F1 interface. The gNB 808 may include only a single gNB-DU or more than the two gNB-DUs shown. The NG interface, Xn-C interface, and F1 interface are logical interfaces.

Figure 9:
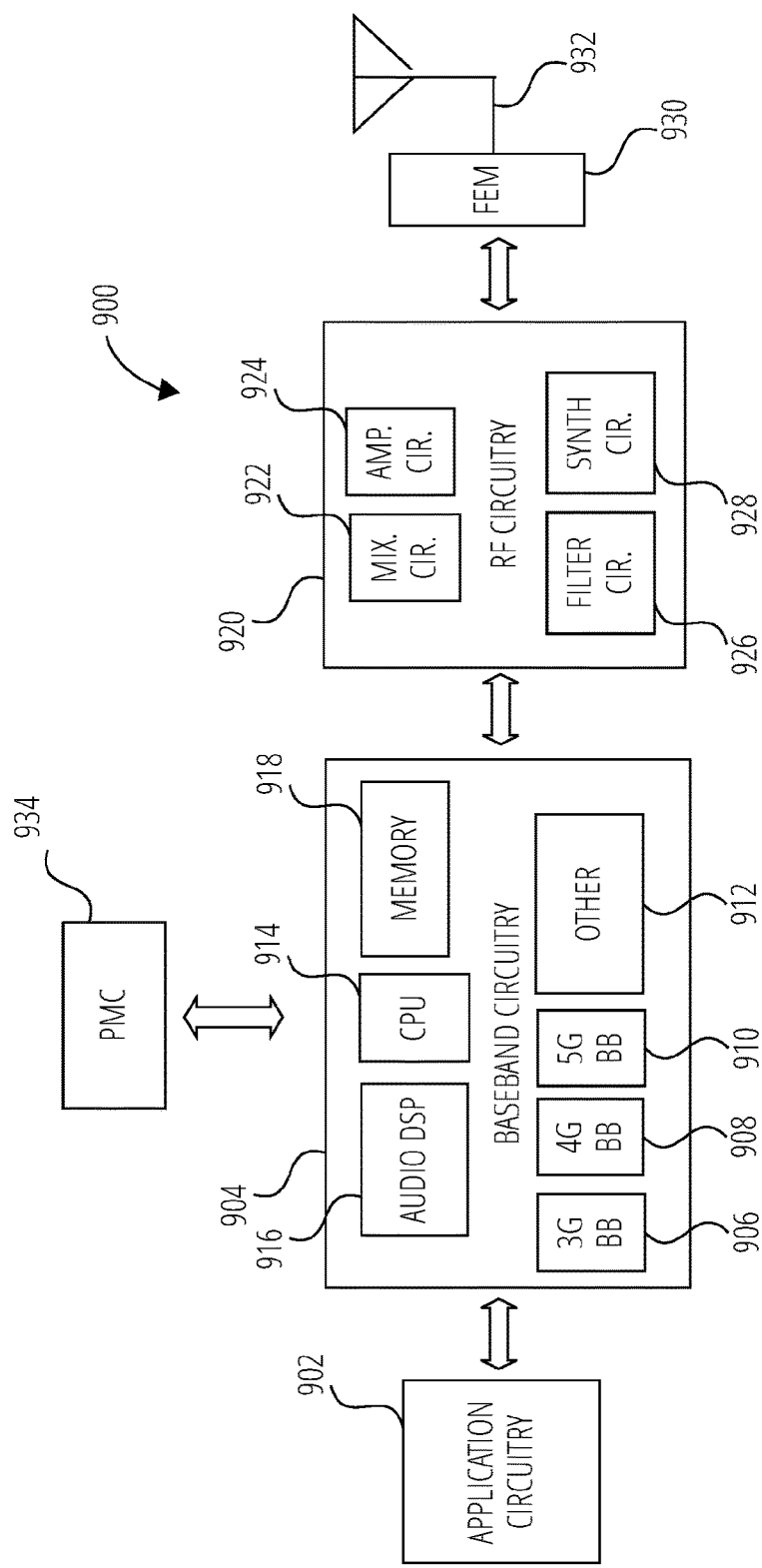
FIG. 9 illustrates a device in accordance with one embodiment.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing Unit (CPU 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
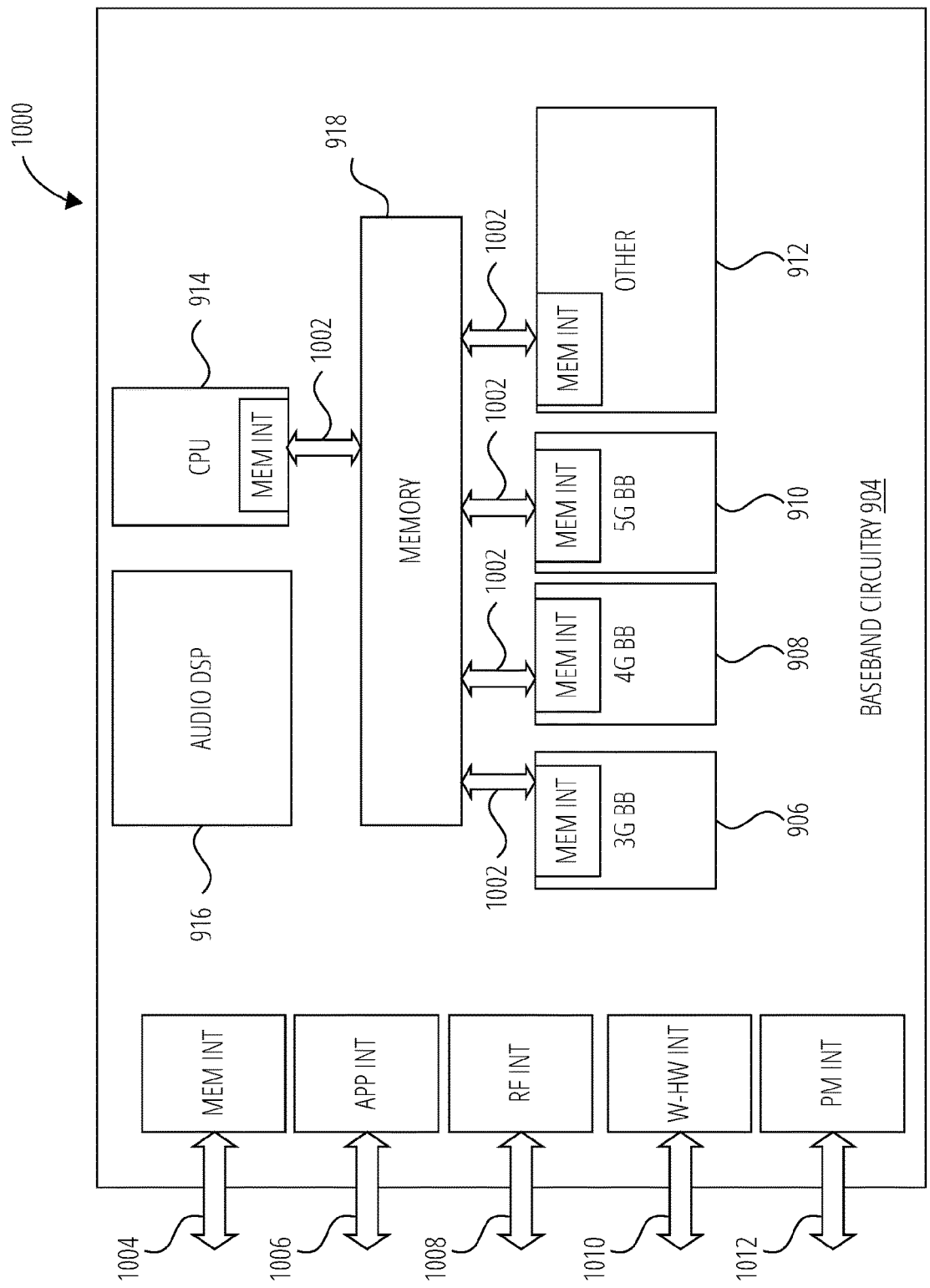
FIG. 10 illustrates an example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
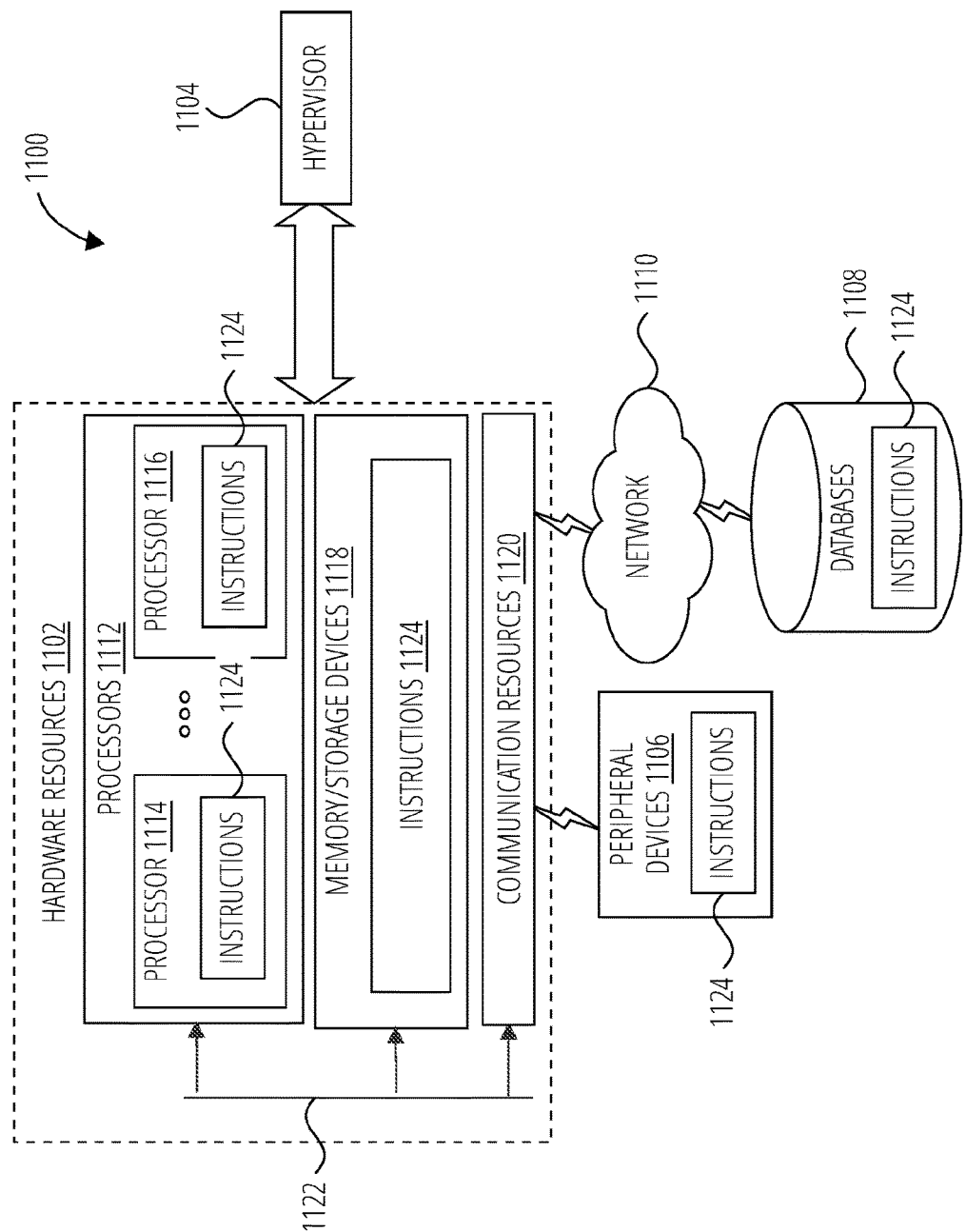
FIG. 11 illustrates components in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is an apparatus for flow control in a first relay node of a wireless communication network, the apparatus comprising an uplink buffer and a processor. The processor to: determine that the first relay node is experiencing congestion for uplink transmission; and in response to determining that the first relay node is experiencing congestion for uplink transmission, generate a message to a second relay node associated with the first relay node, the message indicating a buffer occupancy status of an uplink buffer of the first relay node.

Example 2 is the apparatus of Example 1, the processor further configured to: process one or more buffer status reports received at the first relay node; determine a buffer occupancy value of the uplink buffer of the first relay node corresponding to uplink traffic awaiting transmission in the uplink buffer; adjust the buffer occupancy value to calculate a projected buffer occupancy status of the uplink buffer of the first relay node by at least one of: increase the buffer occupancy value based on an amount of buffered uplink data awaiting transmission to the first relay node indicated in the one or more buffer status reports; and decrease the buffer occupancy value based on uplink grants received at the first relay node; and use the projected buffer occupancy status as the buffer occupancy status in the message to the second relay node.

Example 3 is the apparatus of Example 1, wherein at least one buffer status report of the one or more buffer status reports is from the second relay node, and wherein the second relay node is a descendant of the first relay node such that uplink traffic flows from the second relay node to the first relay node.

Example 4 is the apparatus of Example 1, wherein the message indicating the buffer occupancy status comprises an instantaneous buffer occupancy percentage of the uplink buffer of the first relay node.

Example 5 is the apparatus of Example 1, the processor further configured to: process a buffer status report from the second relay node indicating an amount of buffered uplink data at the second relay node; process a buffer occupancy percentage value from a parent node; and based on the buffer status report and the buffer occupancy percentage value from the parent node, allocate uplink resources for the second relay node to control an uplink data rate of the second relay node.

Example 6 is the apparatus of Example 5, the processor further configured to determine the buffer occupancy status of the uplink buffer of the first relay node based on both uplink traffic awaiting transmission in the uplink buffer of the first relay node and the buffer occupancy percentage value received from the parent node.

Example 7 is the apparatus of Example 5, the processor further configured to trigger generation of the message indicating the buffer occupancy status of the uplink buffer of the first relay node when the buffer status report is received from the second relay node.

Example 8 is the apparatus of Example 5, the processor further configured to: when the buffer occupancy percentage value is received from the parent node, start a timer and write the buffer occupancy percentage value to memory; upon receiving a new buffer occupancy percentage value from the parent node before expiration of the timer, restart the timer and overwrite the buffer occupancy percentage value in the memory with the new buffer occupancy percentage value; and upon expiration of the timer, discard the buffer occupancy percentage value or the new buffer occupancy percentage value from the memory.

Example 9 is the apparatus of Example 8, wherein the timer is configured to expire after a preconfigured timer duration value is reached.

Example 10 is the apparatus of Example 8, the processor further configured to receive a timer duration value with the buffer occupancy percentage value from the parent node, wherein the timer is configured to expire after the timer duration value is reached.

Example 11 is the apparatus of Example 1, the processor further configured to route the message indicating the buffer occupancy status of the uplink buffer of the first relay node to the second relay node based on a route of a data bearer for transporting uplink traffic from the second relay node to the first relay node.

Example 12 is the apparatus of Example 11, the processor further configured to communicate the message indicating the buffer occupancy status of the uplink buffer of the first relay node to the second relay node using an adaptation layer or a backhaul adaptation protocol layer of a wireless communication protocol.

Example 13 is the apparatus of Example 1, wherein determining that the first relay node is experiencing congestion for uplink transmission comprises determining that the uplink buffer of the first relay node has reached or exceeded a predetermined occupancy level for uplink traffic awaiting transmission.

Example 14 is a method for flow control in a first relay node comprising a first uplink buffer associated with a first buffer occupancy status, the method comprising: processing a first message from a second relay node indicating a second buffer occupancy status of a second uplink buffer of the second relay node; determining the first buffer occupancy status based at least in part on the second buffer occupancy status of the second uplink buffer of the second relay node and uplink traffic awaiting transmission in the first uplink buffer of the first relay node; and generating a second message for a third relay node, the second message comprising the first buffer occupancy status, wherein the third relay node is associated with the first relay node.

Example 15 is the method of Example 14, wherein determining the first buffer occupancy status further comprises: processing a buffer status report from the third relay node indicating an amount of buffered uplink data at the third relay node; adding the amount of buffered uplink data at the third relay node to the uplink traffic awaiting transmission in the first uplink buffer of the first relay node; and subtracting, from the uplink traffic awaiting transmission in the first uplink buffer of the first relay node, a size of uplink grants received at the first relay node from the second relay node.

Example 16 is the method of Example 14, wherein the second relay node is a parent relay configured to receive the uplink traffic from the first relay node, and wherein the third relay node is a descendant of the first relay node such that the uplink traffic flows from the third relay node to the first relay node.

Example 17 is the method of Example 14, further comprising allocating uplink resource for the third relay node based on the first buffer occupancy status.

Example 18 is the method of Example 14, further comprising triggering generation of the second message when the first buffer occupancy status is equal to or greater than a predetermined occupancy level.

Example 19 is the method of Example 14, further comprising triggering generation of the second message in response to the buffer status report.

Example 20 is the method of Example 14, further comprising: when the second buffer occupancy status is received from the second relay node, starting a timer and writing a value for the second buffer occupancy status to memory; upon receiving a new buffer occupancy status from the second relay node before expiration of the timer, restarting the timer and overwriting the value in the memory with a new value for the new buffer occupancy status; and upon expiration of the timer, discarding the value or the new value from the memory.

Example 21 is the method of Example 20, wherein the timer is configured to expire after a preconfigured timer duration value is reached.

Example 22 is the method of Example 20, further comprising receiving a timer duration value in the first message from the second relay node, wherein the timer is configured to expire after the timer duration value is reached.

Example 23 is the method of Example 14, further comprising routing the second message to the third relay node based on a route of a data bearer for transporting the uplink traffic between from the third relay node to the first relay node.

Example 24 is the method of Example 14, further comprising communicating the first message and the second message using an adaptation layer or a backhaul adaptation protocol layer of a wireless communication protocol.

Example 25 is a method for flow control in a first relay node of a wireless communication network, the method comprising: determining that the first relay node is experiencing congestion for uplink transmission; and in response to determining that the first relay node is experiencing congestion for uplink transmission, generating a first message to a second relay node associated with the first relay node, the message indicating a buffer occupancy status of an uplink buffer of the first relay node.

Example 26 is the method of Example 25, wherein indicating the buffer occupancy status of the uplink buffer of the first relay node comprises indicating whether the uplink buffer occupancy is higher than a pre-determined threshold.

Example 27 is the method of Example 25, further comprising: processing a second message from a parent node indicating a buffer occupancy percentage value of the parent node; and determining that the first relay node is experiencing congestion for uplink transmission based at least in part on the buffer occupancy percentage value of the parent node.

Example 28 is the method of Example 27, further comprising: processing a buffer status report from the second relay node indicating an amount of buffered uplink data at the second relay node; and further determining that the first relay node is experiencing congestion for uplink transmission based on the buffer status report.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for flow control in a first relay node of a wireless communication network, the apparatus comprising:
an uplink buffer; and
a processor configured to:
determine that the first relay node is experiencing congestion for uplink transmission; and
in response to determining that the first relay node is experiencing congestion for uplink transmission:
process one or more buffer status reports received at the first relay node;
determine a buffer occupancy value of the uplink buffer of the first relay node corresponding to uplink traffic awaiting transmission in the uplink buffer;
adjust the buffer occupancy value to calculate a projected buffer occupancy status of the uplink buffer of the first relay node by at least one of:
increase the buffer occupancy value based on an amount of buffered uplink data awaiting transmission to the first relay node indicated in the one or more buffer status reports; and
decrease the buffer occupancy value based on uplink grants received at the first relay node; and
generate a message to a second relay node associated with the first relay node, the message indicating a buffer occupancy status of the uplink buffer of the first relay node, wherein the projected buffer occupancy status is used as the buffer occupancy status in the message to the second relay node.

2. The apparatus of claim 1, wherein at least one buffer status report of one or more buffer status reports is from the second relay node, and wherein the second relay node is a descendant of the first relay node such that uplink traffic flows from the second relay node to the first relay node.

3. The apparatus of claim 1, wherein the message indicating the buffer occupancy status comprises an instantaneous buffer occupancy percentage of the uplink buffer of the first relay node.

4. The apparatus of claim 1, the processor further configured to:

process a buffer status report from the second relay node indicating an amount of buffered uplink data at the second relay node;
process a buffer occupancy percentage value from a parent node; and
based on the buffer status report and the buffer occupancy percentage value from the parent node, allocate uplink resources for the second relay node to control an uplink data rate of the second relay node.

5. The apparatus of claim 4, the processor further configured to determine the buffer occupancy status of the uplink buffer of the first relay node based on both uplink traffic awaiting transmission in the uplink buffer of the first relay node and the buffer occupancy percentage value received from the parent node.

6. The apparatus of claim 4, the processor further configured to trigger generation of the message indicating the buffer occupancy status of the uplink buffer of the first relay node when the buffer status report is received from the second relay node.

7. The apparatus of claim 4, the processor further configured to:
when the buffer occupancy percentage value is received from the parent node, start a timer and write the buffer occupancy percentage value to memory;
upon receiving a new buffer occupancy percentage value from the parent node before expiration of the timer, restart the timer and overwrite the buffer occupancy percentage value in the memory with the new buffer occupancy percentage value; and
upon the expiration of the timer, discard the buffer occupancy percentage value or the new buffer occupancy percentage value from the memory.

8. The apparatus of claim 7, wherein the timer is configured to expire after a preconfigured timer duration value is reached.

9. The apparatus of claim 7, the processor further configured to receive a timer duration value with the buffer occupancy percentage value from the parent node, wherein the timer is configured to expire after the timer duration value is reached.

10. The apparatus of claim 1, the processor further configured to route the message indicating the buffer occupancy status of the uplink buffer of the first relay node to the second relay node based on a route of a data bearer for transporting uplink traffic from the second relay node to the first relay node.

11. The apparatus of claim 10, the processor further configured to communicate the message indicating the buffer occupancy status of the uplink buffer of the first relay node to the second relay node using an adaptation layer or a backhaul adaptation protocol layer of a wireless communication protocol.

12. The apparatus of claim 1, wherein determining that the first relay node is experiencing congestion for uplink transmission comprises determining that the uplink buffer of the first relay node has reached or exceeded a predetermined occupancy level for uplink traffic awaiting transmission.

13. A method for flow control in a first relay node comprising a first uplink buffer associated with a first buffer occupancy status, the method comprising:
processing a first message from a second relay node indicating a second buffer occupancy status of a second uplink buffer of the second relay node;
processing a buffer status report from a third relay node indicating an amount of buffered uplink data at the third relay node;

determining the first buffer occupancy status based at least in part on the second buffer occupancy status of the second uplink buffer of the second relay node and uplink traffic awaiting transmission in the first uplink buffer of the first relay node;

adding the amount of buffered uplink data at the third relay node to the uplink traffic awaiting transmission in the first uplink buffer of the first relay node;

subtracting, from the uplink traffic awaiting transmission in the first uplink buffer of the first relay node, a size of uplink grants received at the first relay node from the second relay node; and generating a second message for the third relay node, the second message comprising the first buffer occupancy status, wherein the third relay node is associated with the first relay node.

14. The method of claim 13, wherein the second relay node is a parent relay configured to receive the uplink traffic from the first relay node, and wherein the third relay node is a descendant of the first relay node such that the uplink traffic flows from the third relay node to the first relay node.

15. The method of claim 13, further comprising:
when the second buffer occupancy status is received from the second relay node, starting a timer and writing a value for the second buffer occupancy status to memory;
upon receiving a new buffer occupancy status from the second relay node before expiration of the timer, restarting the timer and overwriting the value in the memory with a new value for the new buffer occupancy status; and
upon the expiration of the timer, discarding the value or the new value from the memory.

16. A method for flow control in a first relay node of a wireless communication network, the method comprising:
determining that the first relay node is experiencing congestion for uplink transmission; and
in response to determining that the first relay node is experiencing congestion for uplink transmission:
processing one or more buffer status reports received at the first relay node;
determining a buffer occupancy value of an uplink buffer of the first relay node corresponding to uplink traffic awaiting transmission in the uplink buffer;
adjusting the buffer occupancy value to calculate a projected buffer occupancy status of the uplink buffer of the first relay node by at least one of:
increasing the buffer occupancy value based on an amount of buffered uplink data awaiting transmission to the first relay node indicated in the one or more buffer status reports; and
decreasing the buffer occupancy value based on uplink grants received at the first relay node; and
generating a first message to a second relay node associated with the first relay node, the message indicating a buffer occupancy status of an uplink buffer of the first relay node, wherein the projected buffer occupancy status is used as the buffer occupancy status in the message to the second relay node.

17. The method of claim 16, wherein indicating the buffer occupancy status of the uplink buffer of the first relay node comprises indicating whether the uplink buffer occupancy is higher than a pre-determined threshold.

18. The method of claim 16, further comprising:
processing a second message from a parent node indicating a buffer occupancy percentage value of the parent node;
determining that the first relay node is experiencing congestion for uplink transmission based at least in part on the buffer occupancy percentage value of the parent node;
processing a buffer status report from the second relay node indicating an amount of buffered uplink data at the second relay node; and
further determining that the first relay node is experiencing congestion for uplink transmission based on the buffer status report.

\* \* \* \* \*